United States Patent [19]

Bertolasi

[11] 3,998,093
[45] Dec. 21, 1976

[54] ENERGY MONITORING SYSTEM
[75] Inventor: Robert B. Bertolasi, Rockford, Ill.
[73] Assignee: Kelsey-Hayes Company, Romulus, Mich.
[22] Filed: Apr. 7, 1975
[21] Appl. No.: 565,632
[52] U.S. Cl. .................................. 73/112; 73/198
[51] Int. Cl.² ...................................... G01L 3/26
[58] Field of Search .................. 73/112, 196, 198; 235/92 CA; 324/103 R

[56] References Cited
UNITED STATES PATENTS

| | | | |
|---|---|---|---|
| 2,036,434 | 4/1936 | Paden | 324/103 R X |
| 3,233,176 | 2/1966 | Iben | 324/103 R |
| 3,358,506 | 12/1967 | Rose | 73/233 |
| 3,517,168 | 6/1970 | Gates et al. | 235/92 CA UX |
| 3,517,310 | 6/1970 | Gates et al. | 324/103 R |
| 3,789,201 | 1/1974 | Carpenter et al. | 324/103 R X |

Primary Examiner—Jerry W. Myracle
Attorney, Agent, or Firm—Harness, Dickey & Pierce

[57] ABSTRACT

A system for monitoring and displaying the consumption of energy by measuring the actual energy consumed and comparing the measured energy consumption with an ideal or desired energy consumption. The desired energy consumption data may be based upon actual operations or may be generated by ideal consumption characteristics. In some instances, the ideal figures may be modified to compensate for variations in external conditions.

16 Claims, 2 Drawing Figures

ENERGY MONITORING SYSTEM

BACKGROUND OF THE INVENTION

This invention relates to an energy monitoring and control system and, more particularly, to a system for comparing actual energy consumption with ideal consumption and displaying both, as well as an analog indication of their relative values.

With the present desire to conserve energy, it is important to provide an accurate control on the energy consumed by a variety of systems and to provide an indication when the energy consumption exceeds predetermined ideal rates. In this way, excess energy consumption may be avoided at an earlier time and the excess energy consumption condition rectified.

It is, therefore, a principal object of this invention to provide a system for comparing actual energy consumption with ideal consumption.

It is another object of the invention to provide a system that displays in an easily read form the relationship of the actual energy consumption and the desired energy consumption.

It is a further object of the invention to provide a system that will provide a warning when actual energy consumption exceeds preferred or ideal consumption.

SUMMARY OF THE INVENTION

This invention is adapted to be embodied in a device for monitoring the consumption of energy of a system. The device includes means for generating a signal indicative of the desired energy consumption of the system. Means are additionally provided for measuring the energy actually consumed by the system. Means provide a comparison of the generated signal with the measured value. In an embodiment of the invention the comparison of the ideal and actual consumption values is provided by a visual display.

DETAILED DESCRIPTION OF THE PREFERRED EMBODIMENT

This invention is described in conjunction with systems for monitoring the gas or electrical energy consumption of a factory or the like. It is to be understood, however, that the basic device may be used to monitor the consumption of other sources of energy and to compare actual energy consumption with ideal energy consumption in any of a wide variety of systems. A few examples of such other applications will be given at the end of the description of the preferred embodiment.

Figure 1:
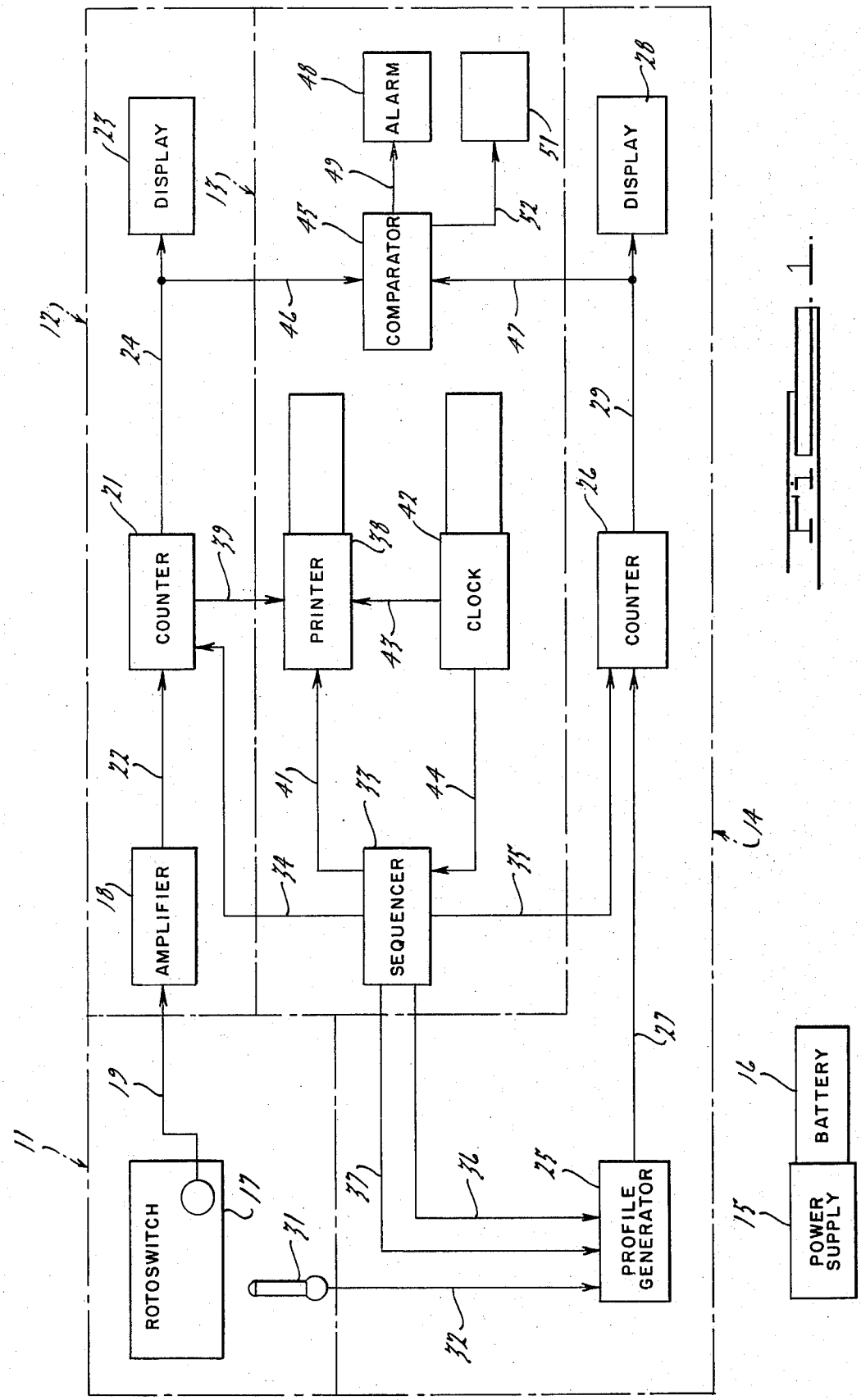
FIG. 1 of the drawings is a schematic view of a gas consumption monitoring device embodying the invention.

The system is illustrated schematically in FIG. 1 and includes various subsystems that are enclosed within the dot-dash lines. These subsystems include a portion that is external to the plant, indicated by the reference numeral 11; a consumption monitoring system, indicated by the reference numeral 12; a control subsystem, indicated by the reference numeral 13; and an objective consumption subsystem, indicated by the reference numeral 14. The various subsystems are supplied with a source of power in any known manner by an AC power supply, indicated by the reference numeral 15, with a backup or standby battery power source 16. The external subsystem 11 is comprised of a gas meter rotoswitch 17 that supplies rate data to a line buffer and amplifier 18 via a conductor 19. The gas meter rotoswitch 17 supplies data indicating the actual total gas consumption of the plant. The line buffer and amplifier 18 provide the rate data signal to an electronic counter 21 via a conductor 22. The electronic counter provides an output to a numerical display, which may be of the light emissive diode type and which is indicated schematically at 23. The signal is transmitted from the counter 21 to the numerical display 23 via a conductor 24.

A consumption profile generator 25 of the objective consumption subsystem 14 provides a signal indicative of the desired instantaneous fuel consumption, in a manner to be described, to an electronic counter 26 via a conductor 27. The output from the counter 26 is transmitted to a numeric display 28, which may also be of the light emissive diode type, via a conductor 29.

The consumption profile generator 25, as has been noted, provides a signal indicative of the desired fuel consumption. This signal may be generated from the actual measurement of efficient fuel consumption, as obtained by historical data, or may be obtained from calculated data based upon desired system efficiency. If desired, the consumption profile generator 25 may be adjusted in response to external temperature sensing devices, as indicated generally by the reference numeral 31, which sensing devices send a signal to the profile generator. At lower building exposure (ambient) temperatures more consumption is required for comfort heating and therefore the profile generator can be suitably adjusted to provide a greater fuel consumption signal in response to this lower ambient temperature in any known manner. The profile generator may have many steps (10 for example) or may be continuous in its adjustment of allowed fuel consumption rate (profile) but is so designated that it may be internally programmed not to exceed a rate which could be safely maintained for a long period of time without exceeding the utility contract limits (daily).

The control subsystem 13 includes a system sequencer, indicated by the reference numeral 33, which sequencer sends reset signals to the counters 21 and 26 via conductors 34 and 35. The counters 21 and 26 may be reset at predetermined intervals. Normally, a 24-hour reset cycle will be employed. In addition, the sequencer 33 sends a reset signal to the consumption profile generator 25 via a conductor 36. The profile generator 25 can operate on these signals at desired time increments as a means of adjusting allowances in response to work conditions. It may be assumed in the system that a given process fuel consumption will be required during certain time periods of the day. For example, during the hours when the plant is not in use, process fuel consumption will be lower. Certain time periods during the day may be found to require greater fuel consumption for plant process than others. The profile generator can be set to generate any desired number of consumption profiles and, of course, the number of such profiles will determine the accuracy of the system. The sequencer 33 also provides a signal to the profile generator 25 via a conductor 37 so as to set the rate of generation by the profile generator 25 in response to the desired time intervals.

In order to accumulate actual consumption data, a printer 38 is provided that receives actual consumption data from the counter 21 via a conductor 39. The printer 38 is operated intermittently at a predetermined time interval via a command signal obtained from the system sequencer 33 through a conductor 41. An electronic clock and calender 42 is also coded into the printer 38 via the conductor 43. The clock and calender 42 provides a day and hour signal to the sequencer 33 through the conductor 44.

As will be described, the numeric displays 23 and 28 may be positioned on an appropriate control panel for observation by an operator to permit visual comparison of the actual consumption with the objective consumption. If desired, a comparator 45 may also be employed that receives signals from the counters 21 and 26 via conductors 46 and 47. The comparator is in circuit with an alarm 48 through the conductor 49. In the event of a predetermined deviation between the actual and objective consumption the alarm 48 will provide a signal to this effect.

The comparator 45 also may provide a signal to an indicator 51 of the light emissive diode type via a conductor 52 to provide a display of the relative status of fuel consumption. In such a display, the actual fuel consumption signal provided by the counter 21 is compared to the internally generated profile consumption signal generated by the counter 26. The resulting difference is displayed in a manner to be described.

Figure 2:
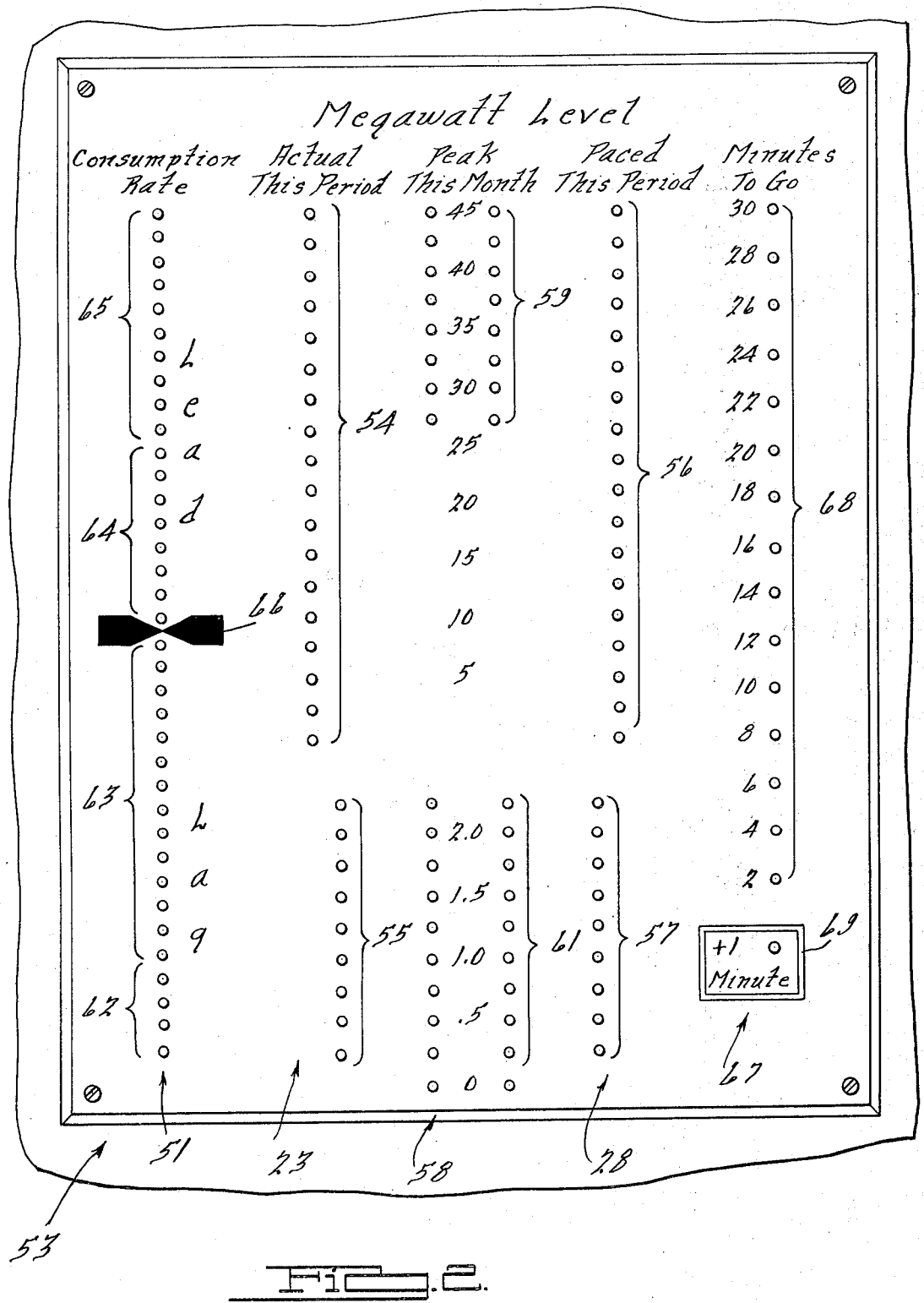
FIG. 2 is a view of a remote display panel operable with an equivalent system for monitoring electrical energy, or by changing the titles, the system of FIG. 1.

Referring now to FIG. 2, an indicator panel, suitable for use in connection with an electrical energy system, as labeled, or with the described system is indicated generally by the reference numeral 53. The indicator panel 53 includes a column of light emissive devices which indicate actual energy consumption for the given period. This column is indicated by the reference numeral 23 and corresponds to the previously indicated numerical display 23 from the counter 21. The light emissive devices in the column 23 are arranged in two groups, indicated by the reference numerals 54 and 55, respectively. Each light of each group represents a given unit of energy consumption. The number of units represented by the lights of the group 54 is greater than the number of energy consumed units represented by the group of lights 55. The total energy consumption for a given period is arrived at by adding the number of lights illuminated in each group with appropriate weighting for their respective unit indication.

The indicator panel 53 also has a corresponding column of light emissive diodes, indicated by the reference numeral 28. The column of lights 28 corresponds to the numeral display 28 of the electronic counter 26. This in turn provides a visual indication of the maximum desired instantaneous energy consumption. The lights of the column 28 are also arranged in two groups, 56 and 57 each of which represents units of a magnitude identical to the corresponding groups 54 and 55 of the actual energy consumption indicator column 23.

Positioned between the columns 23 and 24 is a double column of indicator lights, which may also be light emissive diodes, indicated generally by the reference numeral 58. The column of lights 58 is also arranged in two groups 59 and 61 with the individual lights of each unit representing energy consumption magnitudes equal to those of the columns 54, 56 and 55, 57, respectively. The column 58 is illuminated to indicate a value of energy consumption equivalent to the peak energy consumption for the given period which has been experienced in past usage. This peak energy consumption is recorded throughout each month (for electrical monitors) or 24 hour period (for gas monitors) by a memory (not shown) which is coupled to the final output of the actual energy consumption counter 21. This column provides a reference or target level for constraining energy consumption. The energy consumption indicated by this column may be coupled to the warning device 48 to provide an audible warning when the energy consumption passes the previous energy consumption. The peak consumption memory is reset, as required, by the system sequencer 33.

In order to provide an instantaneous indication of the comparison between the actual and the desired energy consumptions, a column of light emissive diodes 51 is provided. The column 51 is representative of the indication provided by the comparator 45. The lights in the column 51 are arranged in a series of groups, 62, 63, 64 and 65. Between the adjacent lights of the group 63 and 64, an indicator marker 66 is provided on the panel 53. The marker 66 delineates lead in energy consumption (excessive consumption over desirable) from lag in energy consumption (less actual than desired). The lights of the groups 63 and 64 may represent equal units of energy. The lights 62 and 65 also may represent equal units of energy, but a different unit from that represented by the group 63 and 64. Preferably the groups are weighted so that those of the group 62 and 65 represent a greater unit of energy than those of the group 63 and 64.

It is also desirable if the lights of the group 62, 63, 64 and 65 are colored differently from each other. The lights adjacent the indicator 66 may be yellow and those moving in an upward direction should be colored increasing depths of red. Progressing downwardly, toward the end of the group 62, the light may be of increasing depths of green.

The indicator panel 53 also includes a further column of light emissive devices, indicated generally at 67, which are indicative of time. The column 67 includes a group of lights 68 and a single light 69. The lights of the group 68 represent a given time interval, for example 2 minute intervals, where the light 69 represents a smaller time interval, preferably one minute. The time represented by the column 67 is indicative of the period remaining in the consumption period being indicated and is arrived at by summing the total of the lights of the group 68 with the light 69, if illuminated.

The indicator panel 53, as should be apparent, provides a number of functions. The columns 23 and 28 provide a readily visual comparison between the actual and ideal energy consumptions for a given period. A comparison of the actual energy consumption column 23 with the peak column 58 also will indicate if the energy consumption is reaching an excessive level.

The column 51 will provide an indication of the difference between actual and desired energy consumption. This column should be considered in conjunction with the column 67. If given rate leads desired consumption rate and there is still a substantial time remaining in the period as indicated by the column 67, no immediate action need be taken. If the period indicated by the column 67 progresses, however, a lead in energy consumption indicated by the column 51 should be rectified.

It should be understood that the indicator panel 53 may be only one of many light panels situated throughout the plant. Any number of satellite panels may be employed. In some instances, the satellite displays may not contain all of the indication provided for by the panel described.

The described system is used to sense electrical energy or gas consumption in an entire industrial plant. It should be readily apparent that the same or similar systems may be used to regulate electric or gas energy consumption for specifically heating, lighting, or machinery operation. In fact, the disclosed system may be used to monitor any form of energy consumption, for control or information thereof. Considering briefly the electrical energy system, by providing the comparison between the actual power consumption and the desired power consumption, many efficiencies may be enjoyed. For example, the system can be designed so that the plant is operated so that its periods of peak power consumption coincide with periods during which power rates are lower (off peak rate charges). Also, as many utilities levy fines if excessive power is consumed, the disclosed system is very useful in insuring against such penalties. If desired, the outputs from the counters 21 and 22 may be suitably connected to an appropriate control so that the power consumption can be regulated automatically to prevent excess usage.

The various subcomponents of the system have not been described in detail since these subcomponents either may be readily purchased, such as the rotoswitch 17, counters 21 and 26, and electronic clock and calender 42 or the design is within the scope of those skilled in the art. It is to be understood that various changes and modifications may be made from the system disclosed by those skilled in the art, without departing from the spirit and scope of the invention, as defined by the appended claims.

I claim:

1. A device for monitoring the consumption of energy of a system comprising means for generating a signal indicative of the desired energy consumption of the system, means for measuring the energy actually consumed by the system, means for providing a comparison of the generated signal with the measured value, and means responsive to the comparison of the generated signal with the measured signal for providing an alarm in the event of a predetermined variance.

2. The device as set forth in claim 1 wherein the means for generating the desired energy consumption signal generates a signal related to time.

3. The device as set forth in claim 2 wherein the means for generating the desired energy signal is responsive to an external variable for varying the generated signal in response to such variable.

4. The device as set forth in claim 1 wherein the means for generating the desired energy signal is responsive to an external variable for varying the generated signal in response to such variable.

5. The device as set forth in claim 1 wherein the device measures the gas consumption of a manufacturing plant and the means for measuring the energy consumed includes a gas flow meter.

6. The device as set forth in claim 5 further including means for sensing the ambient temperature and for altering the generated desired energy consumption signal in response to variations in the ambient temperature.

7. The device as set forth in claim 1 further including timed means for influencing the operation of the desired energy consumption generating means and for resetting such means at predetermined time periods.

8. A device as set forth in claim 1 wherein the means for providing a comparison of the generated signal with the measured value comprises a visual display.

9. A device as set forth in claim 8 wherein the visual display comprises adjacent displays of the generated signal and the measured value, respectively.

10. A device as set forth in claim 9 further including comparator means for determining the difference between the generated signal and the measured value and providing an indication thereof.

11. A device as set forth in claim 8 further including means for providing an indication of time remaining in a given period.

12. A device for monitoring the consumption of energy of a system comprising means for generating a signal indicative of the desired energy consumption of the system, starting at a predetermined time, means for measuring the energy actually consumed by the system starting at such predetermined time, means for providing a visual comparison of the generated signal with the measured signal, and means for providing a visual indication of the time remaining in a given period, which period commences with such predetermined time, for permitting an operator to make a determination as to the amount of correction of energy consumption required.

13. A device as set forth in claim 12 wherein the means for providing the visual comparison comprises adjacent displays of the generated signal and the measured value, respectively.

14. A device as set forth in claim 13 further including comparator means for comparing the difference between the generated signal and the measured value and providing a visual indication thereof.

15. A device as set forth in claim 12 further including timed means for influencing the operation of the desired energy consumption generating means and for resetting such means at predetermined time periods.

16. A device as set forth in claim 12 wherein the means for generating the desired energy signal is responsive to an external variable for varying the generated signal in response to such variable.

* * * * *